United States Patent [19]
Ballou

[11] 3,919,892
[45] Nov. 18, 1975

[54] ENDLESS POWER TRANSMISSION BELT STRUCTURE

[75] Inventor: David G. Ballou, Ozark, Mo.

[73] Assignee: Dayco Corporation, Dayton, Ohio

[22] Filed: Aug. 12, 1974

[21] Appl. No.: 497,002

[52] U.S. Cl. ................................. 74/231 P; 74/234
[51] Int. Cl.² ...................... F16G 1/00; F16G 5/00
[58] Field of Search ........... 74/231 P, 232, 233, 234

[56] References Cited
UNITED STATES PATENTS

| | | | |
|---|---|---|---|
| 3,478,613 | 11/1969 | Waugh et al. | 74/233 |
| 3,566,706 | 3/1971 | Fix | 74/233 |
| 3,657,938 | 4/1972 | Fisher | 74/233 |
| 3,820,409 | 6/1974 | Meadows | 74/233 |
| 3,847,029 | 11/1974 | Ray | 74/233 |

*Primary Examiner*—Leonard H. Gerin
*Attorney, Agent, or Firm*—Reuben Wolk

[57] ABSTRACT

An endless power transmission belt structure is provided and has load-carrying means and a thermoplastic elastomer on at least one side of the load-carrying means with a rubber compound arranged between the load-carrying means and the thermoplastic elastomer with the rubber compound assuring the provision of a tenacious bond between the thermoplastic elastomer and the load-carrying means.

20 Claims, 5 Drawing Figures

ENDLESS POWER TRANSMISSION BELT STRUCTURE

BACKGROUND OF THE INVENTION

In the highly competitive endless power transmission belt industry there is a continuing effort to make endless power transmission belts of materials which on the one hand are capable of providing the desired overall belt performance and on the other hand are comparatively inexpensive. Many attempts have been made to make each belt of a variety of cooperating materials each of which is selected because it provides some special performance characteristic to the component portion of the endless belt which it comprises. Although theoretically various materials suggest themselves for certain component portions of a belt such as the load-carrying section, the tension section, or the compression section it is not always feasible to construct a belt with the component portions made of various materials because it is often very difficult to bond or adhere these various materials into an acceptable unitary belt structure.

SUMMARY

This invention provides an endless power transmission belt structure having a unique combination of materials defining its component portions with such portions being tenaciously bonded together to define a belt structure which is economical, may be made using presently known methods and processes, and provides satisfactory performance for an extended service life.

In particular, the belt structure of this invention comprises load-carrying means and a thermoplastic elastomer on at least one side of the load-carrying means with a rubber compound arranged between load-carrying means and thermoplastic elastomer to assure the provision of a tenacious bond between the thermoplastic elastomer and the load-carrying means.

Other details, uses, and advantages of this invention will be readily apparent from the embodiments thereof presented in the following specification, claims, and drawing.

BRIEF DESCRIPTION OF THE DRAWING

The accompanying drawing shows present preferred embodiments of this invention, in which.

DESCRIPTION OF ILLUSTRATED EMBODIMENTS

Figure 1:
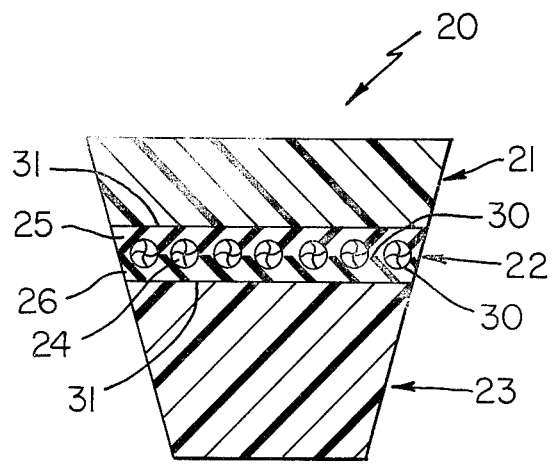
FIG. 1 is a cross-sectional view illustrating one exemplary embodiment of an endless power transmission belt structure of this invention.

Reference is now made to FIG. 1 of the drawing which illustrates one exemplary embodiment ofan endless power of an belt structure of this invention and such belt structure is in the form of an entire endless power transmission belt having a substantially trapezoidal cross-sectional outline and such belt structure is designated generally by the reference numeral 20. The belt structure or belt 20 has a tension section 21, a load-carrying section 22, and a compression section 23 and the load-carrying section 22 comprises load-carrying means in the form of a helically wound load-carrying cord 24.

The tension section 21 and compression section 23 of belt 20 are made of a thermoplastic elastomer preferably in the form of a thermoplastic polyester elastomer. However, it was found very difficult prior to this invention to bond a thermoplastic polyester elastomer such as in the tension section 21 and in the compression section 23 to the load-carrying section or cord 24. Accordingly, in order to provide bonding of the sections 21 and 23 in a tenacious manner on opposite sides of the load-carrying cord 24 a suitable rubber compound is provided in the form of a chlorinated rubber compound as a pair of layers 25 and 26. It has been found by tests that chlorinated rubber adheres to thermoplastic polyester elastomers in a manner which makes the use of these two materials very desirable in making belt structures. The layer 25 provides a tenacious bond between the thermoplastic polyester elastomer defining the tension section 21 and the load-carrying cord 24 and the layer 26 provides a tenacious bond between the thermoplastic polyester elastomer defining the compression section 23 and the load-carrying cord 24.

To further assure that the endless belt 20 is of optimum structural integrity such belt has first adhesive means preferably in the form of an isocyanate adhesive cement 30 between each of its layers 25 and 26 and the load-carrying cord 24 and second adhesive means in the form of adhesive 31 which is compatible with chlorinated rubber and thermoplastic polyester elastomer. Accordingly, the adhesive 31 is between rubber layer 25 and the thermoplastic elastomer defining the tension section 21 and the rubber layer 26 and the thermoplastic elastomer defining the compression section 23.

Figure 2:
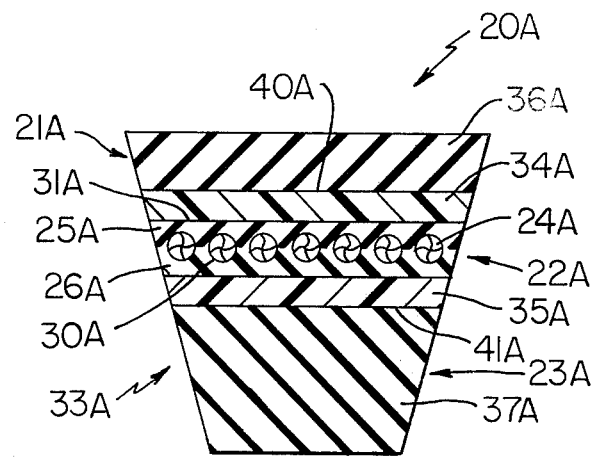
FIG. 2 is a cross-sectional view illustrating another exemplary embodiment of an endless power transmission belt structure of this invention which comprises a platform of an endless belt.
Figure 3:
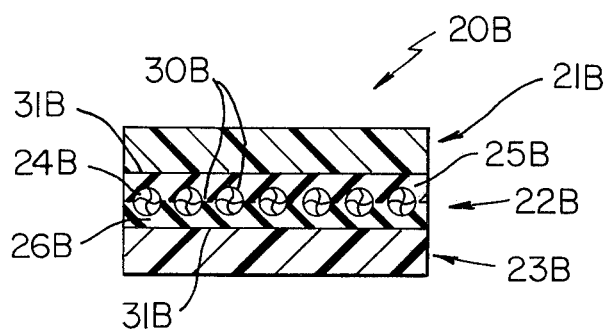
FIG. 3 is a cross-sectional view illustrating another exemplary embodiment of an endless power transmission belt structure of this invention in the form of a flat belt having a rectangular cross-sectional outline.

The complete endless belt 20 has a substantially trapezoidal cross-sectional configuration of the type well known in the art and may utilize a comparatively inexpensive load-carrying cord 24 to define its load-carrying section 22 while employing a thermoplastic polyester elastomer for its tension section 21 and compression section 23; yet, the belt 20 has optimum structural integrity and is not likely to delaminate or come apart due primarily to the utilization of the layers 25 and 26 of chlorinated rubber which bond tenaciously to the thermoplastic elastomer. The adhesives 30 and 31 are employed primarily to assure an even better bond between the sections 21 and 23 and the load-carrying section 22. polyester Other exemplary embodiments of this invention are illustrated in FIGS. 2 and 3 of the drawing. The belt constructions or structures illustrated in FIGS. 2 and 3 are similar to the belt structure 20; therefore, such belt structures will be designated generally by the reference numerals 20A and 20B respectively and parts thereof which are very similar to corresponding parts of the belt structure 20 will be designated by the same reference numerals as in the belt structure or belt 20 followed by their respective letter designation either A or B and not described again in detail. Only those component parts which are substantially different from corresponding parts of the belt 20 will be designated by a new reference numeral also followed by the associated letter designation and described in detail.

The belt structure 20A of FIG. 2 defines what is popularly referred to in the art as a platform 20A and the entire belt shown in FIG. 2 and which uses the platform 20A will be given the reference numeral 33A. The structure or platform 20A comprises the load-carrying section 22A defined by the helically wound load-carrying cord 24A, layers of chlorinated rubber compound 25A and 26A bonded against cord 24A utilizing adhesive means in the form of an isocyanate cement 30A, and layers 34A and 35A of thermoplastic ppolyester elastomer bonded against layers 25A and 26A respectively using a suitable adhesive means or adhesive 31A.

The belt 20A further comprises a suitable rubber compound in the form of a layer of a chlorinated rubber compound which defines the tension section 36A of the belt 33A and a suitable rubber compound in the form of a layer of a chlorinated rubber compound which defines the compression section 37A of the belt 33A. The chlorinated rubber layers or sections 36A and 37A are arranged on surfaces 40A and 41A of layers 34A and 35A arranged remote from the load-carrying cord 24A or section 22A.

The belt structure of FIG. 3 is in the form of an entire endless power transmission belt structure or belt 20B commonly referred to as a flat endless power transmission belt having a substantially rectangular cross-sectional configuration. In a similar manner as in the belt 20, the belt 20B has a tension section 21B, a load-carrying section 22B, and a compression section 23B. The load-carrying section 22B is comprised of a helically wound load-carrying cord 24B and has layers of a rubber compound preferably in the form of a chlorinated rubber compound arranged on opposite sides of the load-carrying cord 24B with the layers 25B and 26B being suitably bonded utilizing adhesive means in the form of an isocyanate cement 30B. Similarly, and as previously described, adhesive means in the form of a suitable adhesive 31B which is compatible with chlorinated rubber and the thermoplastic polyester elastomer may be employed between layers 25B and the tension section 21B and layer 26B and the compression section 23B.

Figure 5:
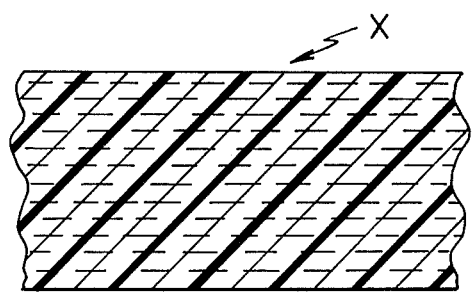
FIG. 5 is a typical fragmentary cross-sectional view similar to FIG. 4 schematically illustrating that the material indicated by cross hatching as being plastic in FIGS. 1, 2, and 3 may have a highly oriented crystalline structure.

The thermoplastic polyester elastomer utilized to define the belts 20, 20A and 20B may have a highly oriented crystalline structure as illustrated schematically at X in FIG. 5 whereby at each location in FIGS. 1, 2, 3 which shows that plastic material is employed such plastic material may be the oriented thermoplastic polyester elastomer.

Figure 4:
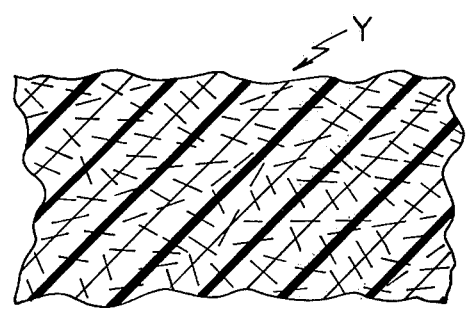
FIG. 4 is a typical fragmentary cross-sectional view schematically illustrating that the material indicated by cross hatching as being plastic in FIGS. 1, 2, and 3 may have a highly unoriented crystalline structure.

Each of the belt structures or belts of FIGS. 1, 2, and 3 may also employ an unoriented thermoplastic polyester elastomer at each location indicated in the drawings that a plastic material is employed and such unoriented crystalline structure is indicated schematically at Y in FIG. 4.

Each of the belts 20, 20A and 20B may be made utilizing any technique known in the art whereby a particular technique will not be disclosed herein for each of these belts.

Each of the helically wound load-carrying cords 24, 24A and 24B may be made of any suitable material utilized in the belt industry and include natural materials, synthetic materials, or combinations thereof. Further, each load-carrying cord is preferably made of a suitable natural or synthetic fibrous material which may have a circular cross-section, as shown; however, it will be appreciated that each cord may have any desired cross-sectional configuration and need not be made of a fibrous material.

The thicknesses of the various layers comprising the various sections of the belt structures 20, 20A, and 20B may be any suitable amount and will vary based on the intended application. In the belt structure or platform 20A, for example, the cord 24A may have a diameter of .050 inch, the layers 25A and 26A of chlorinated rubber on each side thereof may range between .010–.020 inch, and the layers 34A and 35A may range between .020–.030 inch.

In the belt 20 the tension sections 21 and 23 may be of any suitable height or vertical thickness as required. Likewise the thickness or vertical height as viewed in FIG. 3 of the sections 21B and 23B may be varied with the other dimensions of these various layers or sections being defined in accordance with techniques known in the art.

It will also be appreciated that various grades of thermoplastic polyester elastomer may be employed to define the various sections of the belt structures whereby the grade of thermoplastic polyester elastomer is picked based on the use which is to be made thereof in the belt.

Any suitable thermoplastic elastomer may be employed to make the belt structures and preferably each belt structure is made using a high performance thermoplastic polyester elastomer sold under the trademark HYTREL by the E. I. DuPont de Nemours Company, of Wilmington, Del.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt structure comprising, load-carrying means, a thermoplastic polyester elastomer on at least one side of said load-carrying means, and a rubber compound arranged between said load-carrying means and said thermoplastic polyester elastomer, said rubber compound assuring the provision of a tenacious bond between said thermoplastic polyester elastomer and said load-carrying means.

2. A belt structure as set forth in claim 1 in which said rubber compound is a chlorinated rubber compound.

3. A belt structure as set forth in claim 1 and further comprising a thermoplastic polyester elastomer on the other side of said load-carrying means.

4. A belt structure as set forth in claim 3 in which said rubber compound is a chlorinated rubber compound.

5. A belt structure as set forth in claim 4 in which said thermoplastic polyester elastomer on said one side of said load-carrying means defines the tension section of an endless belt and said thermoplastic polyester elastomer on said other side of said load-carrying means defines the compression section of said endless belt.

6. A belt structure as set forth in claim 4 which defines a platform of an endless power transmission belt and further comprising a rubber compound bonded against said thermoplastic elastomer on said one and on said other side on surfaces thereof arranged remote from said cross-sectional configuration.

7. A belt structure as set forth in claim 4 in which said thermoplastic polyester elastomer on said one and on said other side comprises a pair of parallel layers defining said belt structure as a flat endless power transmission belt having a substantially rectangular crosssectional configutation.

8. A belt structure as set forth in claim 1 and further comprising first adhesive means between said load-carrying means and said rubber compound and second adhesive means between said rubber compound and said thermoplastic polyester elastomer.

9. A belt structure as set forth in claim 8 in which said load-carrying means is a helically wound load-carrying cord.

10. A belt structure as set forth in claim 9 in which said helically wound load-carrying cord is made of a fibrous material and has a roughly circular cross-sectional configuration.

11. An endless power transmission belt structure comprising, load-carrying means, a first layer of a thermoplastic polyester elastomer on one side of said load-carrying means, a second layer of a thermoplastic polyester elastomer on the other side of said load-carrying means, and a rubber compound arranged between each of said first and second layers of thermoplastic polyester elastomer and said load-carrying means, said rubber compound assuring the provision of a tenacious bond between said thermoplastic polyester elastomer and said load-carrying means.

12. A belt structure as set forth in claim 11 in which said rubber compound is a chlorinated rubber compound.

13. A belt structure as set forth in claim 12 and further comprising first adhesive means between said load-carrying means and said rubber compound and second adhesive means between said rubber compound and each of said first and second layers of said thermoplastic polyester elastomer.

14. A belt structure as set forth in claim 13 in which said first adhesive means is an isocyanate adhesive.

15. A belt structure as set forth in claim 12 in which said thermoplastic polyester elastomer on said one side of said load-carrying means defines the tension section of an endless belt and said thermoplastic polyester elastomer on said other side of said load-carrying means defines the compression section of said endless belt.

16. A belt structure as set forth in claim 12 which defines a platform of an endless power transmission belt and further comprising a chlorinated rubber compound bonded against said thermoplastic elastomer on said one and on said other side on surfaces thereof arranged remote from said load-carrying means.

17. A belt structure as set forth in claim 12 in which said thermoplastic polyester elastomer on said one and on said other side comprises a pair of parallel layers defining said belt structure as a flat endless power transmission belt having a substantially rectangular cross-sectional configuration.

18. A belt structure as set forth in claim 12 and further comprising first adhesive means between said load-carrying means and said rubber compound and second adhesive means between said rubber compound and said thermoplastic polyester elastomer.

19. A belt structure as set forth in claim 18 in which said load-carrying means is a helically wound load-carrying cord.

20. A belt structure as set forth in claim 19 in which said helically wound load-carrying cord is made of a fibrous material.

* * * * *

UNITED STATES PATENT OFFICE
CERTIFICATE OF CORRECTION

PATENT NO. : 3,919,892
DATED : November 18, 1975
INVENTOR(S) : David G. Ballou

It is certified that error appears in the above-identified patent and that said Letters Patent are hereby corrected as shown below:

Column 2, line 6, "of an" should be -- transmission -- line 61, omit "polyester"

Column 5, line 3, "cross-sectional configuration" should be

-- load carrying means --

Signed and Sealed this seventeenth Day of February 1976

[SEAL]

Attest:

RUTH C. MASON
*Attesting Officer*

C. MARSHALL DANN
*Commissioner of Patents and Trademarks*